(12) United States Patent
Cosentino et al.

(10) Patent No.: US 9,395,234 B2
(45) Date of Patent: Jul. 19, 2016

(54) STABILIZING BASE FOR SCALE

(71) Applicant: Cardiocom, LLC, Chanhassen, MN (US)

(72) Inventors: Daniel L. Cosentino, Excelsior, MN (US); Brian A. Golden, Eden Prairie, MN (US); Brian Burney Seidlitz, Sunfish Lake, MN (US)

(73) Assignee: Cardiocom, LLC, Chanhassen, MN (US)

( * ) Notice: Subject to any disclaimer, the term of this patent is extended or adjusted under 35 U.S.C. 154(b) by 130 days.

(21) Appl. No.: 14/097,480

(22) Filed: Dec. 5, 2013

(65) Prior Publication Data

US 2014/0151135 A1    Jun. 5, 2014

Related U.S. Application Data

(60) Provisional application No. 61/733,674, filed on Dec. 5, 2012.

(51) Int. Cl.
| | | |
|---|---|---|
| *G01G 19/44* | (2006.01) | |
| *G01G 21/23* | (2006.01) | |
| *G01G 21/28* | (2006.01) | |
| *G01G 23/00* | (2006.01) | |
| *F16M 7/00* | (2006.01) | |

(52) U.S. Cl.
CPC ............... *G01G 21/23* (2013.01); *G01G 19/44* (2013.01); *G01G 21/28* (2013.01); *F16M 7/00* (2013.01); *G01G 23/002* (2013.01)

(58) Field of Classification Search
CPC ....... F16M 7/00; G01G 23/002; G01G 21/28; G01G 21/23; G01G 19/44
See application file for complete search history.

(56) References Cited

U.S. PATENT DOCUMENTS

| | | |
|---|---|---|
| 3,743,040 A | 7/1973 | Hutchinson et al. |
| 3,907,503 A | 9/1975 | Betts et al. |
| 3,925,762 A | 12/1975 | Heitlinger et al. |
| 4,144,306 A | 3/1979 | Figueras |
| 4,328,396 A | 5/1982 | Theis |
| 4,476,149 A | 10/1984 | Poppe et al. |
| 4,510,383 A | 4/1985 | Ruppender |
| 4,531,527 A | 7/1985 | Reinhold, Jr. et al. |
| 4,535,782 A | 8/1985 | Zoltan |
| 4,556,866 A | 12/1985 | Gorecki |

(Continued)

FOREIGN PATENT DOCUMENTS

| | | |
|---|---|---|
| DE | 43 35 869 A1 | 10/1994 |
| EP | 0 251 520 A2 | 1/1988 |

(Continued)

OTHER PUBLICATIONS

"Technology to Help Meet Standards and Reduce Costs", Alere Medical Incorporated, 6 pages (1998).

(Continued)

*Primary Examiner* — Randy W Gibson
(74) *Attorney, Agent, or Firm* — Girma Wolde-Michael

(57) ABSTRACT

A scale system includes a scale and a base. The scale includes a plurality of feet and a plurality of load cells, wherein each of the plurality of load cells is associated with one of the plurality of feet. The base includes a plate having an upper surface and a lower surface. A plurality of supports extend from the lower surface. Each of the plurality of supports includes a columnar projection.

20 Claims, 10 Drawing Sheets

(56) References Cited

U.S. PATENT DOCUMENTS

| | | | |
|---|---|---|---|
| 4,576,244 A | 3/1986 | Zeigner et al. | |
| 4,592,893 A | 6/1986 | Poppe et al. | |
| RE32,361 E | 2/1987 | Duggan | |
| 4,712,562 A | 12/1987 | Ohayon et al. | |
| 4,724,521 A | 2/1988 | Carron et al. | |
| 4,803,625 A | 2/1989 | Fu et al. | |
| 4,835,372 A | 5/1989 | Gombrich et al. | |
| 4,838,275 A | 6/1989 | Lee | |
| 4,844,187 A | 7/1989 | Jabero | |
| 4,877,580 A | 10/1989 | Aronowitz et al. | |
| 4,899,758 A | 2/1990 | Finkelstein et al. | |
| 4,916,441 A | 4/1990 | Gombrich | |
| 4,934,469 A * | 6/1990 | Jackson | 177/244 |
| 4,935,346 A | 6/1990 | Phillips et al. | |
| 4,947,858 A | 8/1990 | Smith | |
| 4,998,534 A | 3/1991 | Claxton, III et al. | |
| 5,012,411 A | 4/1991 | Policastro et al. | |
| 5,019,974 A | 5/1991 | Beckers | |
| 5,054,493 A | 10/1991 | Cohn et al. | |
| 5,092,330 A | 3/1992 | Duggan | |
| 5,113,869 A | 5/1992 | Nappholz et al. | |
| 5,212,546 A | 5/1993 | Arazi et al. | |
| 5,241,966 A | 9/1993 | Finkelstein et al. | |
| 5,265,010 A | 11/1993 | Evans-Paganelli et al. | |
| 5,265,605 A | 11/1993 | Afflerbach | |
| 5,281,395 A | 1/1994 | Markart et al. | |
| 5,307,263 A | 4/1994 | Brown | |
| 5,310,146 A * | 5/1994 | Maguire | 248/188.2 |
| 5,331,549 A | 7/1994 | Crawford, Jr. | |
| 5,339,821 A | 8/1994 | Fujimoto | |
| 5,341,291 A | 8/1994 | Roizen et al. | |
| 5,367,667 A | 11/1994 | Wahlquist et al. | |
| 5,379,057 A | 1/1995 | Clough et al. | |
| 5,390,238 A | 2/1995 | Kirk et al. | |
| 5,402,794 A | 4/1995 | Wahlstrand et al. | |
| 5,406,955 A | 4/1995 | Bledsoe et al. | |
| 5,434,611 A | 7/1995 | Tamura | |
| 5,437,285 A | 8/1995 | Verrier et al. | |
| 5,441,047 A | 8/1995 | David et al. | |
| 5,465,082 A | 11/1995 | Chaco | |
| 5,467,773 A | 11/1995 | Bergelson et al. | |
| 5,471,382 A | 11/1995 | Tallman et al. | |
| 5,486,999 A | 1/1996 | Mebane | |
| 5,515,170 A | 5/1996 | Matzinger et al. | |
| 5,522,396 A | 6/1996 | Langer et al. | |
| 5,549,117 A | 8/1996 | Tacklind et al. | |
| 5,549,654 A | 8/1996 | Powell | |
| 5,553,609 A | 9/1996 | Chen et al. | |
| 5,553,623 A | 9/1996 | Ochs | |
| 5,558,638 A | 9/1996 | Evers et al. | |
| 5,560,370 A | 10/1996 | Verrier et al. | |
| 5,563,031 A | 10/1996 | Yu | |
| 5,573,551 A | 11/1996 | Lin et al. | |
| 5,583,758 A | 12/1996 | McIlroy et al. | |
| 5,584,868 A | 12/1996 | Salo et al. | |
| 5,586,557 A | 12/1996 | Nelson et al. | |
| 5,590,648 A | 1/1997 | Mitchell et al. | |
| 5,594,638 A | 1/1997 | Iliff | |
| 5,619,991 A | 4/1997 | Sloane | |
| 5,622,178 A | 4/1997 | Gilham | |
| 5,623,656 A | 4/1997 | Lyons | |
| 5,633,910 A | 5/1997 | Cohen | |
| 5,635,060 A | 6/1997 | Hagen et al. | |
| 5,642,731 A | 7/1997 | Kehr | |
| 5,660,176 A | 8/1997 | Iliff | |
| 5,673,691 A | 10/1997 | Abrams et al. | |
| 5,684,826 A | 11/1997 | Ratner | |
| 5,687,717 A | 11/1997 | Halpern et al. | |
| 5,704,029 A | 12/1997 | Wright, Jr. | |
| 5,704,364 A | 1/1998 | Saltzstein et al. | |
| 5,704,366 A | 1/1998 | Tacklind et al. | |
| 5,711,297 A | 1/1998 | Iliff | |
| 5,724,032 A | 3/1998 | Klein et al. | |
| 5,724,968 A | 3/1998 | Iliff | |
| 5,725,559 A | 3/1998 | Alt et al. | |
| 5,743,267 A | 4/1998 | Nikolic et al. | |
| 5,745,555 A | 4/1998 | Mark | |
| 5,758,652 A | 6/1998 | Nikolic | |
| 5,771,511 A | 6/1998 | Kummer et al. | |
| 5,778,882 A | 7/1998 | Raymond et al. | |
| 5,781,442 A | 7/1998 | Engleson et al. | |
| 5,802,990 A * | 9/1998 | Lin | 108/157.1 |
| 5,822,715 A | 10/1998 | Worthington et al. | |
| 5,827,180 A | 10/1998 | Goodman | |
| 5,828,943 A | 10/1998 | Brown | |
| 5,832,448 A | 11/1998 | Brown | |
| 5,839,438 A | 11/1998 | Graettinger et al. | |
| 5,842,997 A | 12/1998 | Verrier et al. | |
| 5,843,139 A | 12/1998 | Goedeke et al. | |
| 5,846,223 A | 12/1998 | Swartz et al. | |
| 5,868,669 A | 2/1999 | Iliff | |
| 5,874,988 A | 2/1999 | Gu | |
| 5,876,353 A | 3/1999 | Riff | |
| 5,879,163 A | 3/1999 | Brown et al. | |
| 5,881,653 A * | 3/1999 | Pfister | 108/147.13 |
| 5,890,128 A | 3/1999 | Diaz et al. | |
| 5,897,493 A | 4/1999 | Brown | |
| 5,899,855 A | 5/1999 | Brown | |
| 5,910,107 A | 6/1999 | Iliff | |
| 5,911,687 A | 6/1999 | Sato et al. | |
| 5,913,310 A | 6/1999 | Brown | |
| 5,918,603 A | 7/1999 | Brown | |
| 5,931,791 A | 8/1999 | Saltzstein et al. | |
| 5,933,136 A | 8/1999 | Brown | |
| 5,935,060 A | 8/1999 | Iliff | |
| 5,951,300 A | 9/1999 | Brown | |
| 5,956,683 A | 9/1999 | Jacobs et al. | |
| 5,957,861 A | 9/1999 | Combs et al. | |
| 5,960,403 A | 9/1999 | Brown | |
| 5,964,700 A | 10/1999 | Tallman et al. | |
| 5,967,979 A | 10/1999 | Taylor et al. | |
| 5,985,559 A | 11/1999 | Brown | |
| 5,987,519 A | 11/1999 | Peifer et al. | |
| 5,989,917 A | 11/1999 | McAleer et al. | |
| 5,997,476 A | 12/1999 | Brown | |
| 6,007,493 A | 12/1999 | Ericksen et al. | |
| 6,014,626 A | 1/2000 | Cohen | |
| 6,022,315 A | 2/2000 | Iliff | |
| 6,024,699 A | 2/2000 | Surwit et al. | |
| 6,032,119 A | 2/2000 | Brown et al. | |
| 6,038,465 A | 3/2000 | Melton, Jr. | |
| 6,045,513 A | 4/2000 | Stone et al. | |
| 6,059,724 A | 5/2000 | Campell et al. | |
| 6,062,150 A * | 5/2000 | Sikora et al. | 108/190 |
| 6,063,028 A | 5/2000 | Luciano | |
| 6,071,236 A | 6/2000 | Iliff | |
| 6,080,106 A | 6/2000 | Lloyd et al. | |
| 6,085,162 A | 7/2000 | Cherny | |
| 6,088,429 A | 7/2000 | Garcia | |
| 6,101,478 A | 8/2000 | Brown | |
| 6,112,224 A | 8/2000 | Peifer et al. | |
| 6,113,540 A | 9/2000 | Iliff | |
| 6,117,073 A | 9/2000 | Jones et al. | |
| 6,120,440 A | 9/2000 | Goknar | |
| 6,126,596 A | 10/2000 | Freedman | |
| 6,144,837 A | 11/2000 | Quy | |
| 6,148,233 A | 11/2000 | Owen et al. | |
| 6,151,581 A | 11/2000 | Kraftson et al. | |
| 6,167,362 A | 12/2000 | Brown et al. | |
| 6,168,563 B1 | 1/2001 | Brown | |
| 6,168,957 B1 | 1/2001 | Matzinger et al. | |
| 6,171,237 B1 | 1/2001 | Avitall et al. | |
| 6,177,940 B1 | 1/2001 | Bond et al. | |
| 6,217,744 B1 | 4/2001 | Crosby | |
| 6,234,964 B1 | 5/2001 | Iliff | |
| 6,240,393 B1 | 5/2001 | Brown | |
| 6,246,992 B1 | 6/2001 | Brown | |
| 6,248,065 B1 | 6/2001 | Brown | |
| 6,269,339 B1 | 7/2001 | Silver | |
| 6,270,456 B1 | 8/2001 | Iliff | |
| 6,283,923 B1 | 9/2001 | Finkelstein et al. | |
| 6,290,646 B1 | 9/2001 | Cosentino et al. | |
| 6,295,506 B1 | 9/2001 | Heinonen et al. | |
| 6,328,699 B1 | 12/2001 | Eigler et al. | |

(56) References Cited

U.S. PATENT DOCUMENTS

| | | |
|---|---|---|
| 6,336,900 B1 | 1/2002 | Alleckson et al. |
| 6,354,996 B1 | 3/2002 | Drinan et al. |
| 6,368,273 B1 | 4/2002 | Brown |
| 6,398,727 B1 | 6/2002 | Bui et al. |
| 6,402,691 B1 | 6/2002 | Peddicord et al. |
| 6,413,213 B1 | 7/2002 | Essenpreis et al. |
| 6,416,471 B1 | 7/2002 | Kumar et al. |
| 6,454,705 B1 | 9/2002 | Cosentino et al. |
| 6,473,638 B2 | 10/2002 | Ferek-Petric |
| 6,477,424 B1 | 11/2002 | Thompson et al. |
| 6,493,568 B1 | 12/2002 | Bell et al. |
| 6,541,266 B2 | 4/2003 | Modzelewski et al. |
| 6,558,321 B1 | 5/2003 | Burd et al. |
| 6,612,985 B2 | 9/2003 | Eiffert et al. |
| 6,641,533 B2 | 11/2003 | Causey, III et al. |
| 6,723,045 B2 | 4/2004 | Cosentino et al. |
| 6,755,783 B2 | 6/2004 | Cosentino et al. |
| 6,757,898 B1 | 6/2004 | Ilsen et al. |
| 6,770,487 B2 | 8/2004 | Crosby |
| 6,780,645 B2 | 8/2004 | Hayter et al. |
| 6,814,844 B2 | 11/2004 | Bhullar et al. |
| 6,826,887 B2 * | 12/2004 | Skov .................... 52/793.1 |
| 6,849,045 B2 | 2/2005 | Iliff |
| 6,849,237 B2 | 2/2005 | Housefield et al. |
| 6,891,936 B2 | 5/2005 | Kai et al. |
| 6,968,375 B1 | 11/2005 | Brown |
| 7,004,928 B2 | 2/2006 | Aceti et al. |
| 7,056,289 B2 | 6/2006 | Kasper et al. |
| 7,127,290 B2 | 10/2006 | Girouard et al. |
| 7,215,991 B2 | 5/2007 | Besson et al. |
| 7,223,236 B2 | 5/2007 | Brown |
| 7,252,636 B2 | 8/2007 | Brown |
| 7,299,081 B2 | 11/2007 | Mace et al. |
| 7,319,962 B2 | 1/2008 | Goedeke et al. |
| 7,401,413 B1 | 7/2008 | Nelson |
| 7,433,853 B2 | 10/2008 | Brockway et al. |
| 7,478,434 B1 | 1/2009 | Hinton et al. |
| 7,577,475 B2 | 8/2009 | Cosentino et al. |
| 7,624,028 B1 | 11/2009 | Brown |
| 7,647,234 B1 | 1/2010 | Ruderman et al. |
| 7,733,224 B2 | 6/2010 | Tran |
| 7,736,318 B2 | 6/2010 | Cosentino et al. |
| 7,790,992 B1 * | 9/2010 | Abbruscato .................. 177/244 |
| 7,827,040 B2 | 11/2010 | Brown |
| 7,941,327 B2 | 5/2011 | Brown |
| 7,945,451 B2 | 5/2011 | Cosentino et al. |
| 7,972,266 B2 | 7/2011 | Gobeyn et al. |
| 8,001,911 B2 * | 8/2011 | Yankello et al. ............. 108/190 |
| 8,015,025 B2 | 9/2011 | Brown |
| 8,034,294 B1 | 10/2011 | Goldberg |
| 8,140,663 B2 | 3/2012 | Brown |
| 8,419,650 B2 | 4/2013 | Cosentino et al. |
| 8,438,038 B2 | 5/2013 | Cosentino et al. |
| 8,525,643 B2 | 9/2013 | Green et al. |
| 8,532,775 B2 | 9/2013 | Berg et al. |
| 2001/0020229 A1 | 9/2001 | Lash |
| 2001/0029322 A1 | 10/2001 | Iliff |
| 2001/0032099 A1 | 10/2001 | Joao |
| 2001/0048529 A1 | 12/2001 | Fotland |
| 2001/0053875 A1 | 12/2001 | Iliff |
| 2001/0056229 A1 | 12/2001 | Cosentino et al. |
| 2002/0010597 A1 | 1/2002 | Mayer et al. |
| 2002/0018478 A1 | 2/2002 | Takeyama et al. |
| 2002/0019747 A1 | 2/2002 | Ware et al. |
| 2002/0022973 A1 | 2/2002 | Sun et al. |
| 2002/0082480 A1 | 6/2002 | Riff et al. |
| 2002/0082665 A1 | 6/2002 | Haller et al. |
| 2002/0111539 A1 | 8/2002 | Cosentino et al. |
| 2002/0133502 A1 | 9/2002 | Rosenthal et al. |
| 2002/0147423 A1 | 10/2002 | Burbank et al. |
| 2002/0156650 A1 | 10/2002 | Klein et al. |
| 2002/0158775 A1 | 10/2002 | Wallace |
| 2002/0173991 A1 | 11/2002 | Avitall |
| 2003/0001742 A1 | 1/2003 | Eshelman et al. |
| 2003/0004758 A1 | 1/2003 | Luttrell |
| 2003/0028399 A1 | 2/2003 | Davis et al. |
| 2003/0050054 A1 | 3/2003 | Siu |
| 2003/0069753 A1 | 4/2003 | Brown |
| 2003/0083556 A1 | 5/2003 | Cosentino et al. |
| 2003/0229517 A1 | 12/2003 | Meserol et al. |
| 2004/0015191 A1 | 1/2004 | Otman et al. |
| 2004/0034286 A1 | 2/2004 | Kasper et al. |
| 2004/0078220 A1 | 4/2004 | Jackson |
| 2004/0102685 A1 | 5/2004 | Cosentino et al. |
| 2004/0117204 A1 | 6/2004 | Mazar et al. |
| 2004/0122297 A1 | 6/2004 | Stahmann et al. |
| 2004/0139048 A1 | 7/2004 | Kerr, II et al. |
| 2004/0147969 A1 | 7/2004 | Mann et al. |
| 2004/0147982 A1 | 7/2004 | Bardy |
| 2004/0172080 A1 | 9/2004 | Stadler et al. |
| 2004/0199409 A1 | 10/2004 | Brown |
| 2004/0220832 A1 | 11/2004 | Moll et al. |
| 2004/0225533 A1 | 11/2004 | Cosentino et al. |
| 2004/0236187 A1 | 11/2004 | Bock et al. |
| 2004/0260666 A1 | 12/2004 | Pestotnik et al. |
| 2005/0015115 A1 | 1/2005 | Sullivan et al. |
| 2005/0033127 A1 | 2/2005 | Ciurczak et al. |
| 2005/0038332 A1 | 2/2005 | Saidara et al. |
| 2005/0065813 A1 | 3/2005 | Mishelevich et al. |
| 2005/0075116 A1 | 4/2005 | Laird et al. |
| 2005/0172021 A1 | 8/2005 | Brown |
| 2005/0192487 A1 | 9/2005 | Cosentino et al. |
| 2005/0231375 A1 | 10/2005 | Kingston |
| 2005/0279631 A1 | 12/2005 | Celentano |
| 2006/0015017 A1 | 1/2006 | Cosentino et al. |
| 2006/0030890 A1 | 2/2006 | Cosentino et al. |
| 2006/0064030 A1 | 3/2006 | Cosentino et al. |
| 2006/0106290 A1 | 5/2006 | Bulat |
| 2006/0161457 A1 | 7/2006 | Rapaport et al. |
| 2006/0247985 A1 | 11/2006 | Liamos et al. |
| 2006/0248398 A1 | 11/2006 | Neel et al. |
| 2006/0271445 A1 | 11/2006 | Lee et al. |
| 2007/0021979 A1 | 1/2007 | Cosentino et al. |
| 2007/0073590 A1 | 3/2007 | Cosentino et al. |
| 2007/0118422 A1 | 5/2007 | Berger et al. |
| 2007/0155588 A1 | 7/2007 | Stark et al. |
| 2007/0231209 A1 | 10/2007 | Cosentino et al. |
| 2007/0231846 A1 | 10/2007 | Cosentino et al. |
| 2008/0117060 A1 | 5/2008 | Cuddihy et al. |
| 2008/0262871 A1 | 10/2008 | Lee et al. |
| 2008/0294024 A1 | 11/2008 | Cosentino et al. |
| 2009/0037216 A1 | 2/2009 | Bluemler et al. |
| 2009/0138207 A1 | 5/2009 | Cosentino et al. |
| 2009/0138717 A1 | 5/2009 | Calamera et al. |
| 2009/0204028 A1 | 8/2009 | Richards |
| 2009/0216558 A1 | 8/2009 | Reisman et al. |
| 2009/0234916 A1 | 9/2009 | Cosentino et al. |
| 2010/0005416 A1 | 1/2010 | Hedmann et al. |
| 2010/0113891 A1 | 5/2010 | Barrett et al. |
| 2010/0121201 A1 | 5/2010 | Papaioannou |
| 2010/0137693 A1 | 6/2010 | Porras et al. |
| 2010/0249536 A1 | 9/2010 | Cosentino et al. |
| 2010/0295684 A1 | 11/2010 | Hsieh et al. |
| 2011/0098539 A1 | 4/2011 | Estocado |
| 2011/0105979 A1 | 5/2011 | Schlaeper et al. |
| 2011/0125532 A1 | 5/2011 | Cosentino et al. |
| 2011/0307284 A1 | 12/2011 | Thompson et al. |
| 2012/0041771 A1 | 2/2012 | Cosentino et al. |
| 2012/0041775 A1 | 2/2012 | Cosentino et al. |
| 2013/0043997 A1 | 2/2013 | Cosentino et al. |
| 2013/0082837 A1 | 4/2013 | Cosentino et al. |
| 2013/0131574 A1 | 5/2013 | Cosentino et al. |
| 2013/0267795 A1 | 10/2013 | Cosentino et al. |
| 2013/0297344 A1 | 11/2013 | Cosentino et al. |
| 2013/0332730 A1 | 12/2013 | Cosentino et al. |
| 2014/0006054 A1 | 1/2014 | Cosentino et al. |
| 2014/0020234 A1 * | 1/2014 | Luis y Prado .................. 29/592 |

FOREIGN PATENT DOCUMENTS

| | | |
|---|---|---|
| EP | 0 256 806 A2 | 2/1988 |
| EP | 0 290 610 A1 | 11/1988 |
| EP | 0 505 627 A2 | 9/1992 |
| EP | 0 890 919 A1 | 1/1999 |

(56) References Cited

FOREIGN PATENT DOCUMENTS

| | | |
|---|---|---|
| EP | 0 896 828 A2 | 2/1999 |
| EP | 1 147 739 A2 | 10/2001 |
| EP | 0 880 407 B1 | 4/2002 |
| EP | 1 416 417 A2 | 5/2004 |
| EP | 1 547 516 A1 | 6/2005 |
| JP | 01006865 A | 1/1989 |
| JP | 9-173304 | 7/1997 |
| WO | WO 94/24929 | 11/1994 |
| WO | WO 96/13707 | 5/1996 |
| WO | WO 97/29847 | 8/1997 |
| WO | WO 98/18211 | 4/1998 |
| WO | WO 98/38909 | 9/1998 |
| WO | WO 98/40835 | 9/1998 |
| WO | WO 98/50873 | 11/1998 |
| WO | WO 98/58338 | 12/1998 |
| WO | WO 99/04043 | 1/1999 |
| WO | WO 99/22236 | 5/1999 |
| WO | WO 99/25110 | 5/1999 |
| WO | WO 00/33072 | 6/2000 |
| WO | WO 00/41613 | 7/2000 |
| WO | WO 00/62662 | 10/2000 |
| WO | WO 01/00086 A1 | 1/2001 |
| WO | WO 01/21065 A1 | 3/2001 |
| WO | WO 01/22343 A2 | 3/2001 |
| WO | WO 01/39089 A1 | 5/2001 |
| WO | WO 01/69513 A2 | 9/2001 |
| WO | WO 01/74229 A2 | 10/2001 |
| WO | WO 01/89363 A2 | 11/2001 |
| WO | WO 03/005891 A1 | 1/2003 |
| WO | WO 03/075756 A1 | 9/2003 |
| WO | WO 2004/106885 A2 | 12/2004 |
| WO | WO 2004/113911 A1 | 12/2004 |
| WO | WO 2005/040793 A1 | 5/2005 |
| WO | WO 2007/044877 A2 | 4/2007 |

OTHER PUBLICATIONS

"Telemedicine NEW: BP-TEL™ Transtelephonic Blood Pressure: Your Partner in Telemedicine", http://www.aerotel.com/telemed/, 2 pgs. (Feb. 6, 2001) last updated.
"Telemedicine, Your Partner in Telemedicine", Aerotel Medical Systems, Ltd., Internet at http://www.aerotel.com/telemed/under.html, last updated Sep. 5, 1998.
"Thin-Link: Like Having a Personal Coach and Dietitian in Your Home Every Day," http://web.archive.org/web/20041009141519/www.thin-link.com/program_weightloss.html, 2 pages (Date Printed Aug. 31, 2005).
Bittorf et al., "Teaching Resources for Dermatology on the WWW—Quiz System and Dynamic Lecture Scripts using a HTTP—Database Demon," *Proc AMIA Annu Fall Symp*., pp. 46-50 (1996).
Request for Ex Parte Reexamination Filed Nov. 9, 2007, 25 pages.
Request for Inter Parties Reexamination Filed Aug. 1, 2008, 126 pages.
Action Closing Prosecution for Application Nos. 90/010,053 and 95/000,386, dated Jan. 17, 2012, 57 pages.
Excerpts from File History of U.S. Pat. No. 6,968,375, filed Sep. 8, 2000, Stephen J. Brown (339 pages).
Excerpts from File History of U.S. Pat. No. 7,252,636, filed Jun. 13, 2005, Stephen J. Brown (336 pages).
Excerpts from File History of U.S. Pat. No. 8,015,025, filed Nov. 15, 2006, Stephen J. Brown (271 pages).
Excerpts from File History of U.S. Pat. No. 8,140,663, filed Jun. 13, 2005, 505 pages.
File History of U.S. Pat. No. 6,368,273, filed Apr. 28, 1999, Stephen J. Brown, 407 pages.
File History of Reexam Application No. 90/009,281, Filed Sep. 23, 2008, Stephen J. Brown, 646 pages.
Reexamination Control No. 90/009,281, Notice of Intent to issue a Reexamination Certificate, dated Mar. 16, 2010, 7 pages.
EPO Communication pursuant to Rules 161(1) and 162 EPC for Application No. 09764994.1, dated Jul. 22, 2011.
First Communication from European Patent Application No. 08767827.2 dated Sep. 28, 2011.
European Search Report for Application No. 02768819.1, 3 pages, mailed Feb. 23, 2005.
European Search Report for Application No. 10151955.1, 5 pages, mailed Aug. 10, 2010.
European Search Report for Application No. 10166822.6, 5 pages, mailed Sep. 14, 2010.
European Search Report for Application No. 10181162.8, 7 pages, mailed Jan. 12, 2011.
European Search Report for Application No. 08767827.2 (PCT/US2008/006453), 7 pages, mailed Mar. 21, 2011.
European Search Report for Application No. 10181851.6, 4 pages, mailed Jul. 22, 2011.
European Search Report for Application No. 10181855.7, 5 pages, mailed Jul. 22, 2011.
European Search Report for Application No. 11168162.3, 6 pages, mailed Jul. 28, 2011.
European Search Report for Application No. 11167368.7, 7 pages, mailed Sep. 29, 2011.
European Search Report for Application No. 11167369.5, 9 pages, mailed Oct. 6, 2011.
Groner et al., "An Introduction to the CLINFO Prototype Data Management and Analysis System", R-1541-NIH, 69 pages. (Dec. 1977).
Hughes, S., "Bedside Terminals: Clinicom," *Clinical Computing*, vol. 5, No. 1 pp. 3 and 22-28 (1988).
International Preliminary Report on Patentability for PCT/US2010/030497, 8 pages, mailed Aug. 25, 2011.
International Search Report for International Application No. PCT/US00/24425, 8 pages, mailed Jan. 2, 2002.
International Search Report for International Application No. PCT/US02/28465, 6 pages, mailed Dec. 10, 2002.
International Search Report for International Application No. PCT/US03/07099, 8 pages, mailed Jul. 22, 2003.
International Search Report and Written Opinion for International Application No. PCT/US2004/041122, 13 pages, mailed Sep. 15, 2005.
International Search Report and Written Opinion for International Application No. PCT/US2005/005739, 13 pages, mailed Oct. 24, 2005.
International Search Report and Written Opinion for International Application No. PCT/US2006/036407, 12 pages, mailed Jan. 23, 2007.
International Search Report and Written Opinion for International Application No. PCT/US2007/008223, 14 pages, mailed Aug. 23, 2007.
International Search Report and Written Opinion for International Application No. PCT/US2007/002556, 17 pages, mailed May 28, 2008.
International Search Report and Written Opinion for International Application No. PCT/US2007/008250, 16 pages, mailed Jun. 23, 2008.
International Search Report and Written Opinion for International Application No. PCT/US08/06453, 12 pages, mailed Sep. 29, 2008.
International Search Report and Written Opinion for International Application No. PCT/US2009/067090, 14 pages, mailed Feb. 12, 2010.
International Search Report and Written Opinion for International Application No. PCT/US2010/030497, 16 pages, mailed Jul. 27, 2010.
International Search Report and Written Opinion for International Application No. PCT/US2011/043643, 8 pages, mailed Sep. 23, 2011.
International Search Report and Written Opinion for International Application No. PCT/US2012/037571, 12 pages, mailed Aug. 31, 2012.
International Search Report and Written Opinion for International Application No. PCT/US2012/057896, 11 pages, mailed Feb. 13, 2013.
International Search Report and Written Opinion for International Application No. PCT/US2012/038386 mailed Jul. 11, 2013.
International Search Report and Written Opinion for International Application No. PCT/US2013/044954 mailed Sep. 20, 2013.

(56) References Cited

OTHER PUBLICATIONS

Invitation to Pay Additional Fees with Partial International Search for International Application No. PCT/US2006/027440, 8 pages, mailed Mar. 8, 2007.

Invitation to Pay Additional Fees with Partial International Search for International Application No. PCT/US2007/002556, 8 pages, mailed Apr. 3, 2008.

Invitation to Pay Additional Fees with Partial International Search for International Application No. PCT/US2007/008250, 9 pages, mailed Apr. 16, 2008.

Invitation to Pay Additional Fees with Partial International Search for International Application No. PCT/US2013/035271, 6 pages, mailed Nov. 4, 2013.

Lobach, D., "Electronically Distributed, Computer-Generated, Individualized Feedback Enhances the Use of a Computerized Practice Guideline," *Proc. Annu. Symp. Comput. Appl. Med. Care*, pp. 493-497 (1996).

Lobach, D. et al., "Computerized Decision Support Based on a Clinical Practice Guideline Improves Compliance with Care Standards," *The American Journal of Medicine*, vol. 102, pp. 89-98 (Jan. 1997).

Lobach, D. et al., "Development and Evaluation of a Computer-Assisted Management Protocol (CAMP): Improved Compliance with Care Guidelines for Diabetes Mellitus," *Proc. Annu. Symp. Comput. Appl. Med. Care*, pp. 787-791 (1994).

Lüthje, L. et al., "Detection of heart failure decompensation using intrathoracic impedance monitoring by a triple-chamber implantable defibrillator," *Heart Rhythm*, vol. 2, No. 9, pp. 997-999 (Sep. 2005).

Nilasena, D. et al., "A Computer-Generated Reminder System Improves Physician Compliance with Diabetes Preventive Care Guidelines," *Proc. Annu. Symp. Comput. Appl. Med. Care*, pp. 640-645 (1995).

Patel, U. et al., "A Computer-Based, Automated, Telephonic System to Monitor Patient Progress in the Home Setting", *Journal of Medical Systems*, vol. 16, Nos. 2/3, pp. 101-112 (1992).

Schrezenmeier, J. et al., "Computer Assisted Insulin Dosage Adjustment—Perspectives for Diabetes Control," *Hormone and Metabolic Research, Supplemental Series*, vol. 24, pp. 116-123 (1990).

Teixeira, P. et al., "Weight Loss Readiness in Middle-Aged Women: Psychosocial Predictors of Success for Behavioral Weight Reduction," *Journal of Behavioral Medicine*, vol. 25, No. 6, pp. 499-523 (Dec. 2002).

Vincent et al., "The Effects of a Computer-Assisted Reminder System on Patient Compliance With Recommended Health Maintenance Procedures", Proc. Annu. Symp. Comput. Appl. Med. Care, pp. 656-660 (1995).

Webpage for "Accu-Chek Compact System," 2 pages.

Webster's Ninth New Collegiate Dictionary Definition of "Computer", 4 pages (1990).

Yazolino, L., "Effective, Daily At-home Monitoring of Chronically Ill Patients," *Medical Electronics*, 4 pages (Sep. 1998).

\* cited by examiner

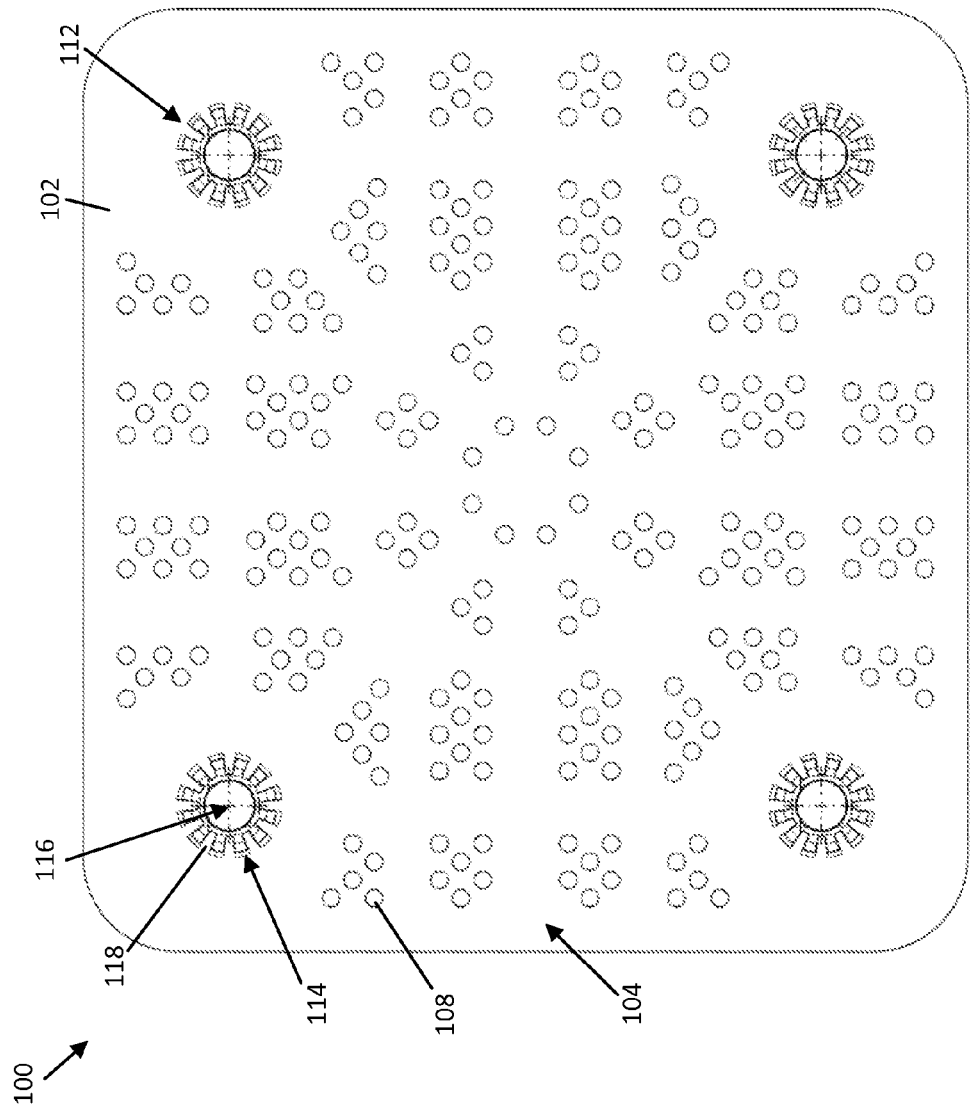

ially deep pile carpet). They are free to deflect towards the top plate independent of the other feet, imbalanced loads may result in inaccurate results. Also, forces acting against the top plate from below, e.g., by carpet pile contacting the plate may also adversely affect accuracy. Prior art solutions to this problem have included increasing the size of the feet, such that they do not penetrate as deeply into the carpet pile. This solution, however, increases unit cost and still may not solve the problems associated with carpet pile contacting the plate. Moreover, the greater surface area of the feet may cause the user to experience an unstable "floating" or sliding feeling if the scale is placed on the carpet pile. This is also why simply laying a flat piece of material (such as plywood) on carpet pile is not desirable. A flat sheet of plywood is not configured to provide the desired stability for using a scale on a carpet.

STABILIZING BASE FOR SCALE

This application claims the benefit of U.S. Provisional Application Ser. No. 61/733,674 filed Dec. 5, 2012 which application is incorporated herein by reference.

INTRODUCTION

Home healthcare providers, such as nurses and technicians, travel to the homes of patients to perform many different tests, take vital signs, and administer medicines. Accordingly, they must carry the vast majority of their instruments and equipment with them. Those instruments and equipment must also operate under a variety of environmental conditions. In particular, many home healthcare providers carry a basic scale for weighing a patient. Although scales themselves are fairly portable (e.g., a typical bathroom-type scale), their accuracy can be effected by the type of surface on which they are placed during use. For example, on a hard surface (such as a tiled bathroom floor), they are more accurate than if positioned on a carpeted floor (especially deep pile carpet).

Two types of portable scales are typically available in the marketplace. The first type utilizes one or more springs or load cells between an upper plate and a lower plate. As a weight is applied to the upper plate, the distance between the upper and lower plates decreases, which deforms the spring (s) or load cell(s) and a mechanical dial or electronic screen displays the weight. The second type of scale utilizes multiple load cells, typically one associated with each of the scale's feet. One load cell is located between each of the feet and a top plate upon which the weight is applied. These types of scales are extremely accurate, but their accuracy may be adversely affected by forces acting against the individual feet or the top plate. Since each foot is free to deflect towards the top plate independent of the other feet, imbalanced loads may result in inaccurate results. Also, forces acting against the top plate from below, e.g., by carpet pile contacting the plate may also adversely affect accuracy. Prior art solutions to this problem have included increasing the size of the feet, such that they do not penetrate as deeply into the carpet pile. This solution, however, increases unit cost and still may not solve the problems associated with carpet pile contacting the plate. Moreover, the greater surface area of the feet may cause the user to experience an unstable "floating" or sliding feeling if the scale is placed on the carpet pile. This is also why simply laying a flat piece of material (such as plywood) on carpet pile is not desirable. A flat sheet of plywood is not configured to provide the desired stability for using a scale on a carpet.

Other solutions to the above problems regarding the accuracy of scales when used on carpet pile have been attempted. For example, U.S. Pat. No. 4,934,469 to Jackson depicts a scale having first and second projection pads that extend from the bottom plate. These types of pads, however, could only be used on the first type of scale utilized above, which includes a load cell or spring between an upper plate and a lower plate. Although the scale includes projecting pads, these pads are not aligned with the rigid pads that function as feet for the scale. Additionally, the deepest projection pads are about 16 mm in length. Particularly deep carpet pile could still contact the bottom plate, thereby applying an upward force against the bottom of the scale. If the feet are configured to deflect independent of each other and the bottom plate, inaccurate readings would result.

Stabilizing Base for Scale

The scale system technology disclosed herein is particularly useful when using a scale on a variety of surfaces, including on thick carpets or rugs. The systems disclosed herein help ensure accurate readings, regardless of the type of surface upon which the scale system is used. This is particularly helpful for home healthcare providers, who often need to perform their tasks on the elderly or infirmed, who may have difficulty ambulating to a room with a hard floor surface. Similarly, scales used in conjunction with computerized health monitoring systems may also benefit from the technologies described herein, since such scales may be located proximate a computer, which may not always be located in a room with a hard floor surface. Accordingly, the scale may be used whether a patient is in a carpeted living room, in a bedroom, or in a tiled bathroom. The technology described herein improves the accuracy of scales that include a load cell associated with independently deflectable feet. Certain benefits may also extend to scales that utilize a single load cell or spring, used in conjunction with scales having two plates that deflect towards each other.

In one aspect, the technology relates to a scale system having: a scale including a plurality of feet and a plurality of load cells, wherein each of the plurality of load cells is associated with one of the plurality of feet; and a base having: a plate having an upper surface and a lower surface; and a plurality of supports extending from the lower surface, wherein each of the plurality of supports includes a columnar projection. In an embodiment, the scale system further includes a plurality of locators on the upper surface, wherein each of the plurality of locators is adapted to contact one of the plurality of feet. In another embodiment, the system includes a plurality of ribs extending from the lower surface. In yet another embodiment, the plate defines a plurality of openings therethrough. In still another embodiment, the scale includes four feet and four load cells, and wherein the base includes four locators and four supports. In other embodiments, each of the plurality of supports includes: an annular projection extending from the lower surface; and a plurality of columnar projections extending from the annular projection.

In another embodiment of the above aspect, the scale system includes an angled ramp connecting the annular projection to at least one of the plurality of ribs. In another embodiment, the angled ramp includes a plurality of ramps. In certain embodiments, a distance from the bottom surface to an end of the columnar projection is at least about 20 mm, at least about 25 mm, or about 27.5 mm. In another embodiment, the columnar projection is adapted to penetrate carpet pile. In yet another embodiment, the scale includes a scale perimeter dimension and the base includes a base perimeter dimension greater than the scale perimeter dimension. In still another embodiment, at least one of the plurality of locators includes a receiver for receiving at least one of the plurality of feet. In other embodiments, the locator includes a resilient element.

In another aspect, the technology relates to a base for a scale having a plurality of feet and a plurality of load cells, wherein each of the plurality of load cells is associated with one of the plurality of feet, the base having: a plate having an upper surface and a lower surface; and a plurality of supports extending from the lower surface, wherein each of the plurality of supports includes a columnar projection. In an embodiment, the case includes a plurality of locators on the upper surface, wherein each of the plurality of locators is adapted to contact one of the plurality of feet. In another embodiment, each of the plurality of supports includes: an annular projection extending from the lower surface; and a plurality of columnar projections extending from the annular projection. In yet another embodiment, the base includes an angled ramp connecting the annular projection to the lower surface. In still another embodiment, the angled ramp includes a plurality of ramps.

BRIEF DESCRIPTION OF THE DRAWINGS

The following drawing figures, which form a part of this application, are illustrative of embodiments of systems and methods described below and are not meant to limit the scope of the technology in any manner, which scope shall be based on the claims.

FIGS. 1A-1D are perspective, top, side, and bottom views of a scale base.

DETAILED DESCRIPTION

Figure 1A:
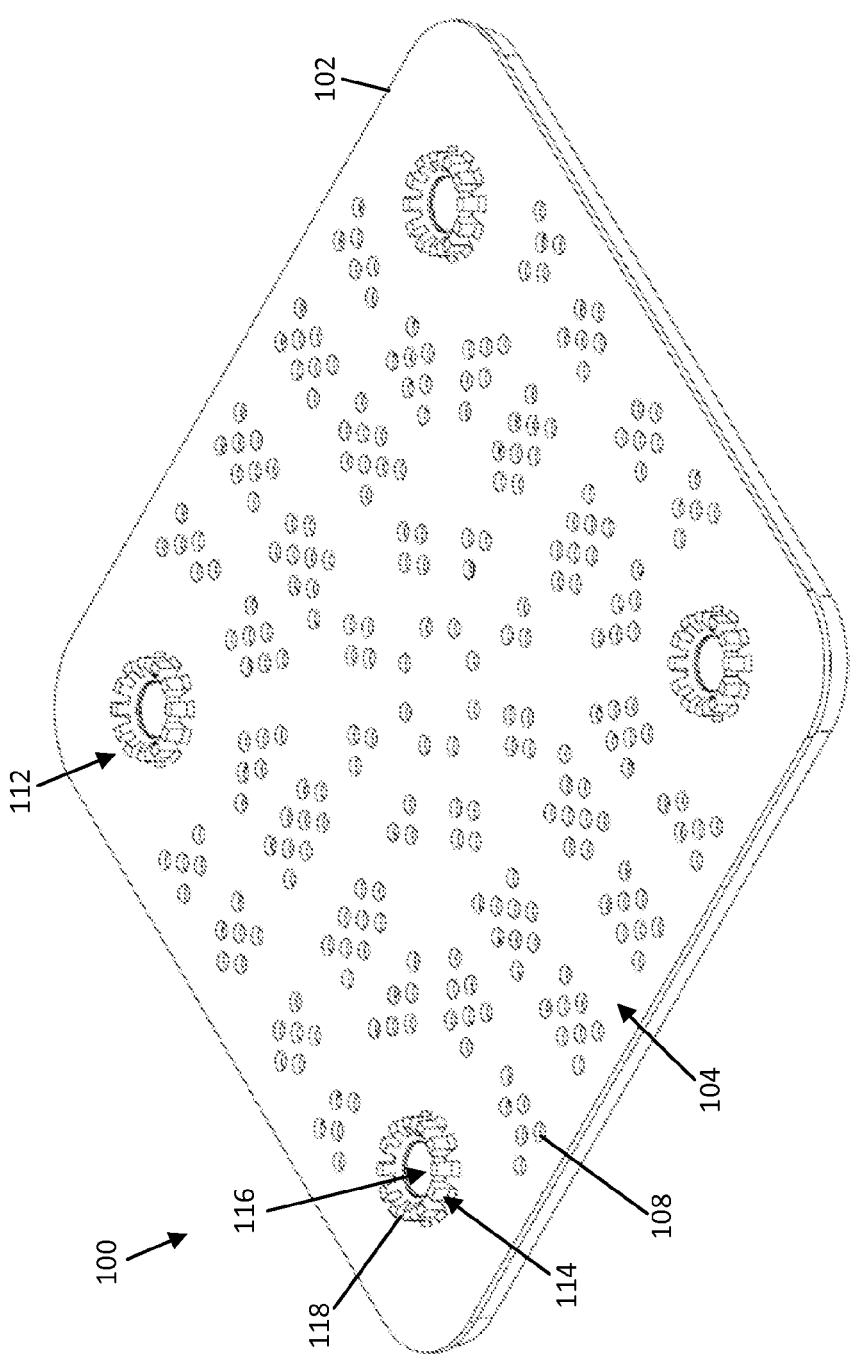
Figure 1C:
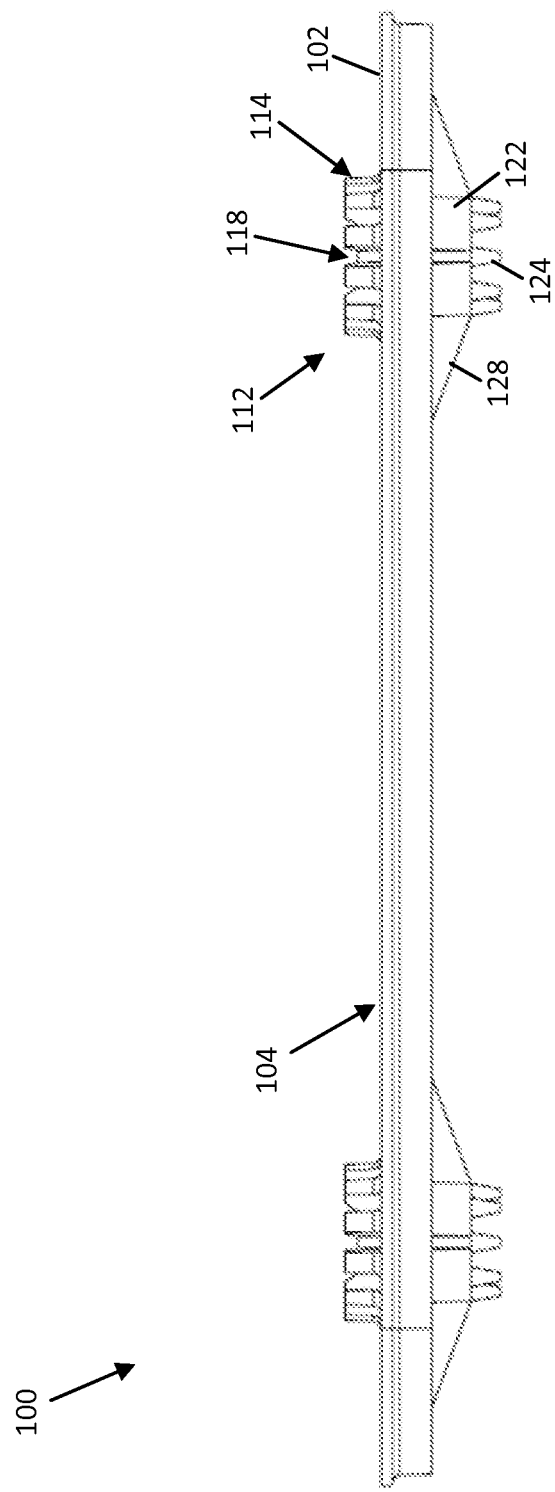
Figure 1D:
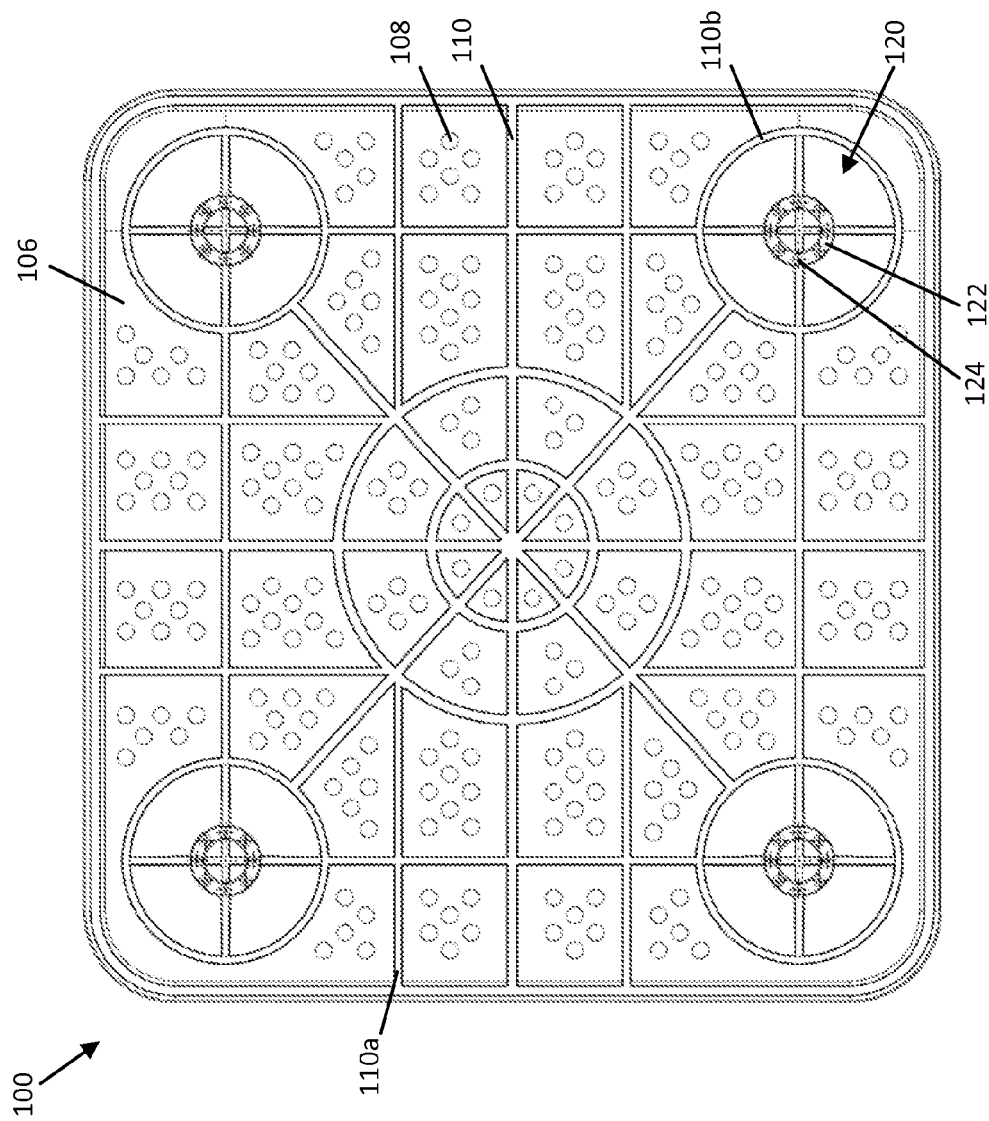

Reference will now be made in detail to the exemplary aspects of the present disclosure that are illustrated in the accompanying drawings. Wherever possible, the same reference numbers will be used throughout the drawings to refer to the same or like structure.

The technologies described herein are particularly useful for multiple load cell scales that include multiple, independently deflectable legs, and accordingly, are described primarily in the context thereof. However, as the base provides a stable surface upon which to place a scale, any type of scale may be used in conjunction therewith. The improved stability increases the user confidence on the scale, thus enabling the user to stand comfortably, without fear of slipping or falling.

FIGS. 1A-1D depict a base 100 for a scale system. The base 100 includes a generally flat plate 102 having a top surface 104 and a bottom surface 106. A plurality of openings 108 may penetrate the thickness of the plate 102. The openings 108 help reduce weight of the plate 102, as well as the material required to manufacture the plate 102. The openings 108 may be formed when the plate 102 is manufactured (i.e., using an injection molding process) or may be formed subsequent to manufacture (i.e., by drilling). A number of ribs 110 may extend from the bottom surface 106 to provide rigidity to the plate 102. These ribs 110 may be straight 110a, curved 110b, or may be of other configurations, as required or desired for a particular application. Ribs need not be utilized if the plate 102 is of sufficient thickness to resist deformation or bending during use.

A number of locators in the form of receivers 112 project from the top surface 104 of the plate 102. The receivers 112 are configured and dimensioned to receive an associated scale foot. The receivers 112 include a raised circular wall 114 surrounding a central recess 116. The wall 114 may be solid or may be penetrated by one or more gaps 118. The central recess 116 may be level with the top surface 104 or may be raised or recessed relative thereto. The receivers 112 may be dimensioned so as to receive snugly the scale feet. This helps ensure that the scale feet stay centered or substantially aligned above supports 120 that extend from the bottom surface 106. The supports 120 may be configured as required or desired for a particular application, and help secure a position of the base when being used on carpet pile (that is, the supports 120 help prevent sliding). In the depicted embodiment, the supports 120 include an annular projection 122 that extends from the bottom surface 106 of the plate 102. Extending from the bottom of the annular projection 122 are a number of columnar projections 124. The columnar projections 124 are sized so as to penetrate carpet pile. Depending on the density of the carpet pile, ends of the columnar projections 124 may be able to contact the more stable portion of the carpet surface to which the pile is bound.

One or more angled ramps 128 extend from an outer surface of the annular projection 122 to a nearby rib 110b. Alternatively, the ramps 128 may extend to the bottom surface 106. The ramps 128 buttress the associated annular projections 122, thus increasing the stability thereof. The annular projections 122 provide support to the columnar projections 124, enabling the columnar projections 124 to project a considerable distance away from the bottom surface 106 of the plate 102, without losing structural integrity when supporting a load. In some embodiments, the columnar projections 124 extend ½ an inch to two inches from the annular projections 122. In other embodiments, other optimal ranges may be used.

Figure 2:
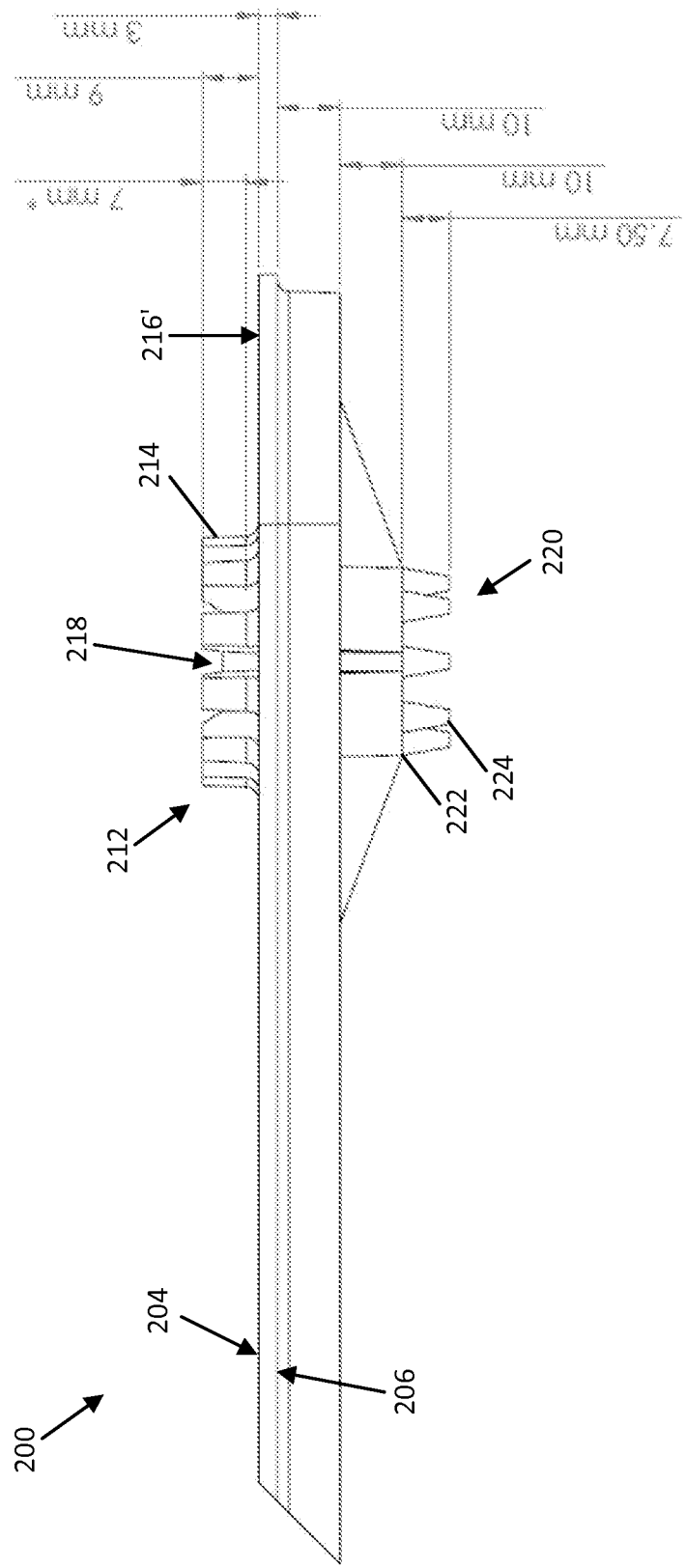
FIG. 2 is a partial enlarged side view of a scale base.

FIG. 2 depicts a partial enlarged side view of the base 200. Here, dimensions of one embodiment of a base 200 are shown. In the depicted embodiment, the central recess 216 is elevated a distance of about 2 mm above the upper surface 204 (the level of the central recess 216 is depicted by line 216'). The circular wall 214 is about 7.5 mm above the central recess 216. Of course, any height may be utilized that is sufficient to hold the scale feet in place. The ribs 210 extend about 10 mm below the bottom surface 206. The bottom surface of the annular projection 222 is another 10 mm below the ribs 210, and the columnar projections 224 terminate about 7 mm further. Accordingly, the distance between the bottom surface 206 and the end of the bottom columnar projection is about 27.5 mm. This significant distance, coupled with the tapering shape of the columnar projections 224, allows the columnar projections 224 to penetrate deep into carpet pile, while maintaining stability of the base. Other total distances from the bottom surface 206 to the end of the columnar projections 224 are contemplated. For example, the total distance may be at least about 20 mm or at least about 25 mm.

Figure 3A:
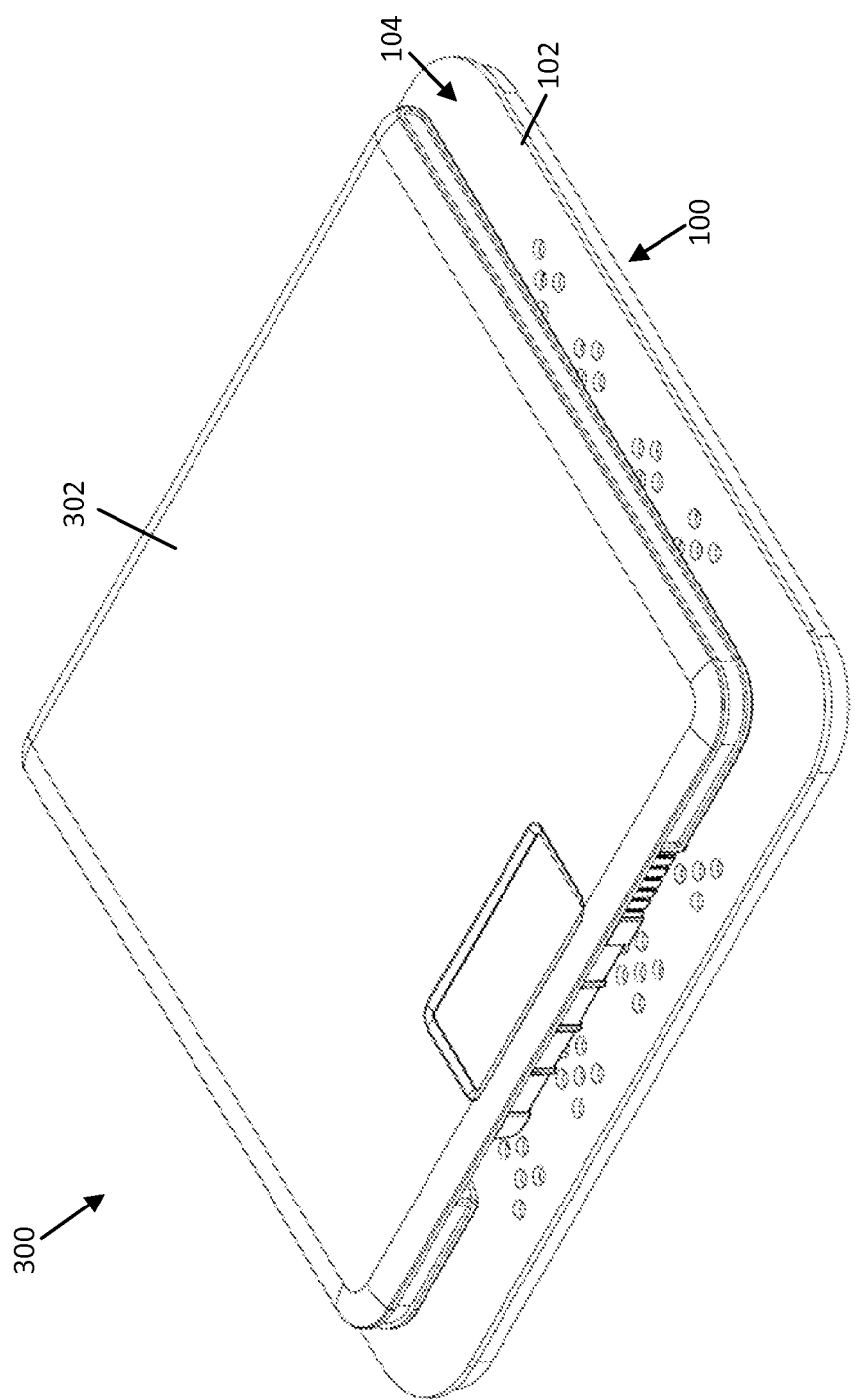
FIGS. 3A and 3B are perspective and side views, respectively, of a scale and base system.
Figure 3B:
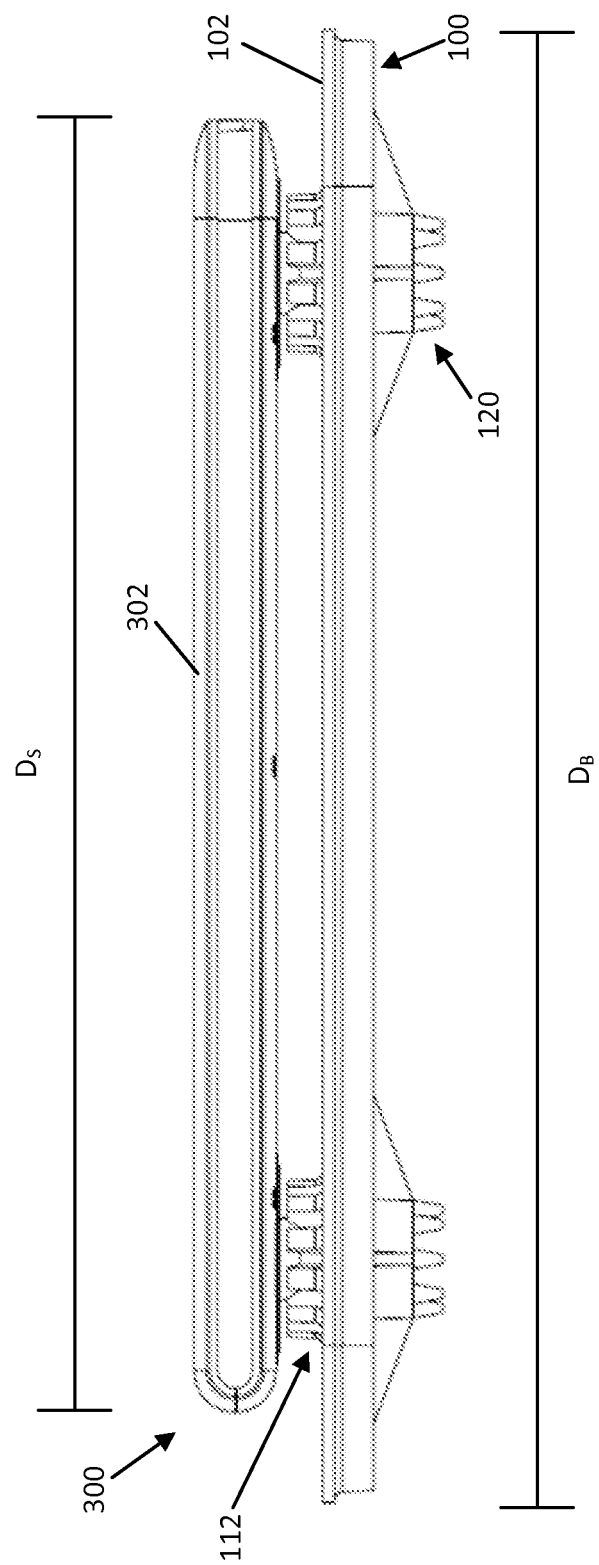

FIGS. 3A and 3B depict a scale system 300, including a base 100 and a scale 302. In some embodiments, the base 100 and scale 302 are provided as separate pieces. In other embodiments, the base 100 and scale 302 are connected as a single unit. As can be seen, outer dimensions $D_B$ of the base 100 are greater than outer dimensions $D_S$ of the scale 302. These dimensions may be both of width and depth of the base 100 and the scale 302, but may also be characterized as the perimeters of the base 100 and the scale 302. Regardless, the larger dimensions of the base 100 prevents carpet pile that may wrap around the base 100 from contacting the scale 302, thus ensuring no adverse effect on the scale 302. The larger dimensions of the base 100 further ensures the scale 302 is securely placed on the base 100, thereby preventing the scale 302 from sliding off the base 100. Although hidden by the circular receivers 112, each of the four scale feet rest within a corresponding receiver 112, thus ensuring that the feet remain aligned with the supports 120. As described in FIGS. 3A and 3B, the top surface 104 of the base 100 is positioned an optimal distance above carpet pile so as to prevent the carpet from adversely interfering with the scale 302. Accordingly, the base 100 is used to ensure that the scale 302 is positioned on an even plane above carpet pile, or other potentially interfering articles in order to allow the scale 302 to deliver accurate readings.

The scale system 300 may also have a locking feature to lock the base 100 to scale 302 or, alternatively, the two components may be permanently attached. For example, in an embodiment, the base 100 and scale 302 are individual pieces, wherein the base 100 includes a locking feature for securing the scale 302 to the base 100 for additional support. The locking feature may be any suitable locking mechanism. For example, in an embodiment the locking feature is comprised of two straps that are used to secure the scale 302 to the base 100. In some embodiments, the straps are made of Velcro and the scale has a corresponding hook that attaches thereto. In other embodiments, the locking feature comprises a clamp, screw, anchors, bolts, or other suitable attachment mechanisms. Accordingly, the locking feature allows a user to selectively lock and release the scale 302 from the base 100. Although straps are discussed above as one example of a locking feature, it is known to one of ordinary skill in the art that other locking features may alternatively be used.

Figure 4B:
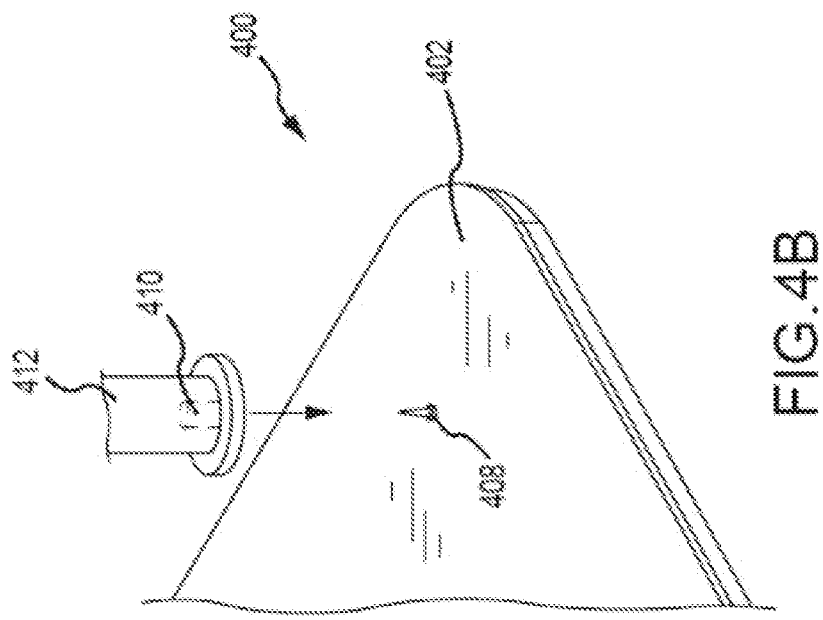
FIGS. 4A-4D depict locators for a base.
Figure 4A:
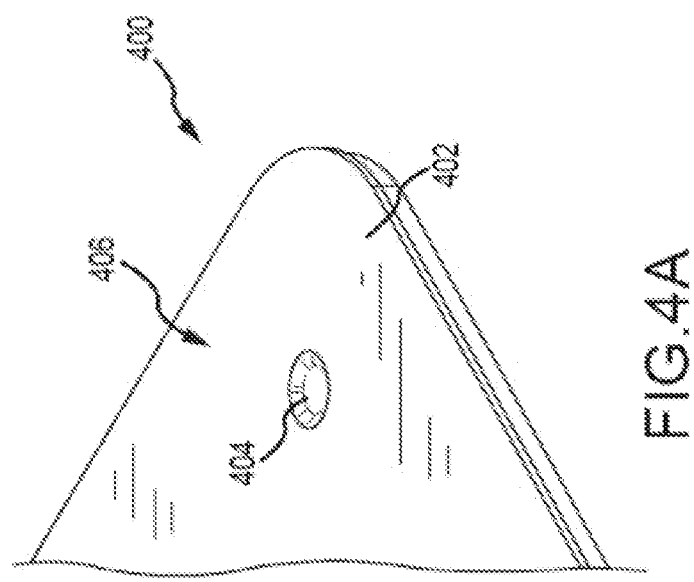

FIGS. 4A-4D depict various embodiments of locators for a scale base 400. The various types of locators aid in positioning a scale, particularly, a foot of a scale, on a plate 402 of the base 400. FIG. 4A depicts a locator in the form of a recess 404 in a top surface 406 of the base 400. The recess 404 may be formed during the molding process (if a plastic base is utilized), or after the molding process. FIG. 4B depicts a locator in the form of a pin or projection 408. The projection 408 may interface with an opening 410 in a scale foot 412. In one embodiment, the projection 408 may be formed of a rigid material (similar to the plate 402 material, for example) while scale foot 412 may include a resilient material (a rubber gasket, for example). The gasket and pin 408 may form a friction connection to keep the scale foot 412 in contact with the base 400, such that the scale and base 400 may be transported as a single unit. In other embodiments, a screw, bolt, or other fastener may be used.

Figure 4C:
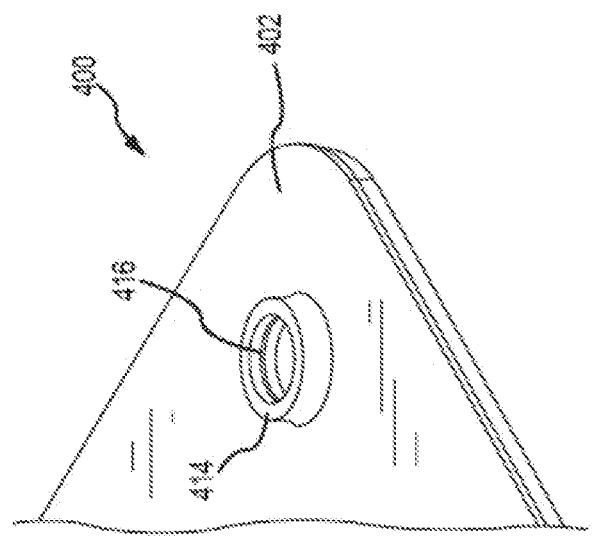
Figure 4D:
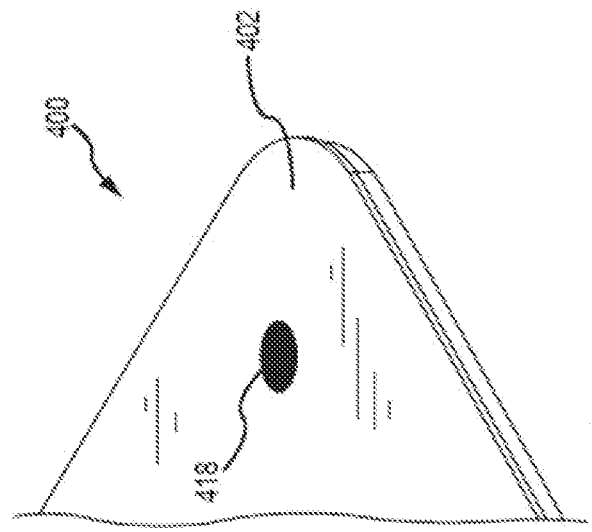

FIG. 4C depicts a locator in the form of a receiver 414, similar to the receivers depicted herein. Here, however, the receiver 414 includes a resilient (e.g., rubber) gasket 416 that may form a friction connection with an outer surface of a scale foot. FIG. 4D depicts a locator in the form of a colored or shaped mark 418 that identifies a location upon which to place a scale foot. Other configurations of locators are contemplated. It may be desirable to align the locators (regardless of the type utilized) with the supports on the underside of the base. This may help to prevent torque on the base, which may result in inaccurate scale readings.

Figure 5:
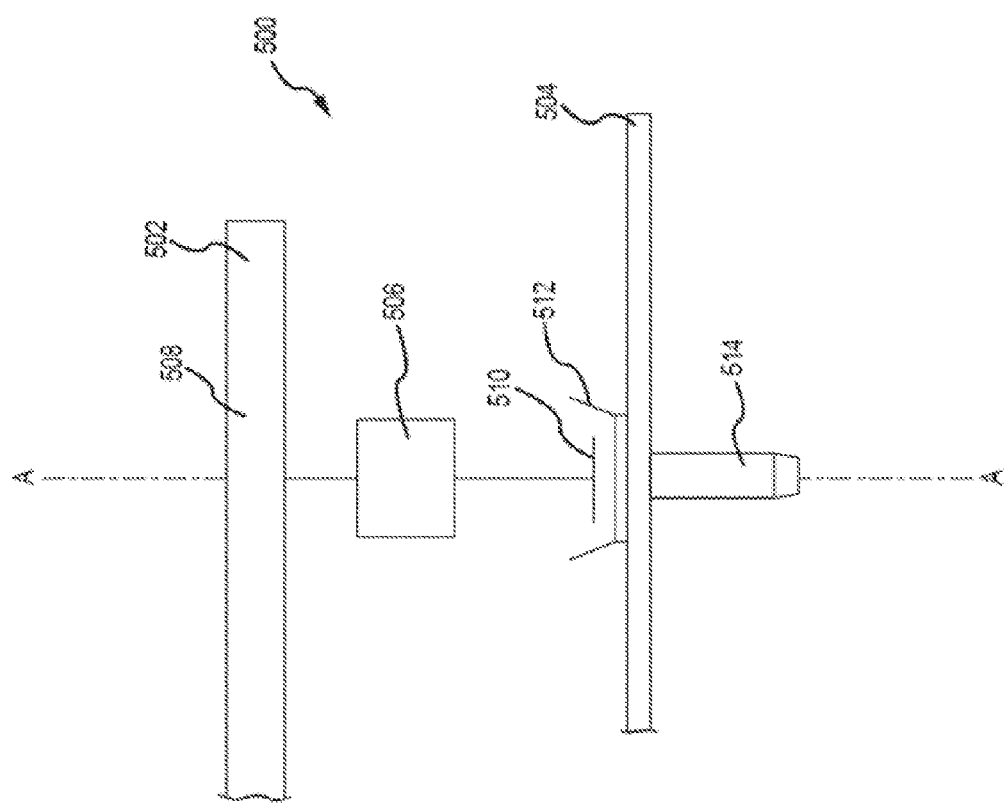
FIG. 5 depicts a schematic view of a scale and base system.

FIG. 5 depicts such an aligned relationship between the various components in a scale and base system 500. The base system 500 includes a scale 502 and a base 504. At least one load cell 506 is located below a top plate 508 and above a foot 510 of the scale 502. Both the load cell 506 and foot 510 are aligned along axis A. The foot 510 rests in a locator, in this case a receiver 512, located on an upper portion of the base 504. The receiver 512 is aligned along axis A with a support 514, which in this case is configured as a single projection. By ensuring alignment of the load cell 506, foot 510, receiver 512, and support 514 along the single axis A, torque forces are reduced or eliminated, thus helping ensure accurate readings from the scale. Of course, alignment is not critical, but may also help prevent feelings of instability on the part of a user as they stand on the scale 502.

Table 1, as shown below, depicts the results of tests performed with and without a base (such as the base 100 described above) on different types of carpeted surfaces. One Control and Tests 1-4 were performed. In the Control, a scale base was not utilized. Instead, a digital scale having four load cells was placed on a plywood base floor. The resulting reading for each test weight is depicted. The test conditions of Tests 1-4 are also depicted. Tests 1 and 3 did not include a scale base during testing, while Tests 2 and 4 did include a base as depicted above. Additional information regarding the surface upon which the scale or scale/base combination was tested is also identified. In Tests 3 and 4, two layers of carpet pad were utilized. As can be seen, use of the base in Tests 2 and 4 greatly improves accuracy of the scale. Test 3 is also particularly illustrative of the problem of using a scale having individually deflectable feet alone on a thick carpeted surface. In that case, the scale registered a load only once in eight trials. Thus, from the test data, it is clear use of a base such as the type depicted herein helps ensure accuracy of the scale being used.

TABLE 1

Test Data on Uncarpeted and Carpeted Surfaces

|  | Test | | | | |
| --- | --- | --- | --- | --- | --- |
|  | Control | 1 | 2 | 3 | 4 |
| Base | None | No | Yes | No | Yes |
| Carpet | None | Thick | Thick | Plush | Plush |
| Carpet Pad | None | 1x | 1x | 2x | 2x |
| Base Floor | Plywood | Plywood | Plywood | Plywood | Plywood |
| Load (lbs) | | | | | |
| 50 | 50.1 | 17.1 | 50.1 | 0.0 | 50.2 |
| 50 | 50.0 | 14.8 | 50.0 | 0.0 | 50.0 |
| 100 | 100.3 | 27.1 | 100.1 | 0.0 | 100.3 |
| 100 | 100.3 | 27.2 | 100.1 | 0.0 | 100.2 |
| 150 | 150.5 | 41.3 | 150.3 | 0.0 | 150.2 |
| 150 | 150.2 | 40.5 | 150.3 | 0.0 | 150.2 |
| 200 | 200.6 | 46.5 | 200.2 | 29.4 | 200.1 |
| 200 | 200.5 | 51.7 | 200.2 | 0.0 | 200.1 |

Numerous other changes may be made which will readily suggest themselves to those skilled in the art and which are encompassed in the spirit of the disclosure and as defined in the appended claims. While various embodiments have been described for purposes of this disclosure, various changes and modifications may be made which are well within the scope of the present technology. Numerous other changes may be made which will readily suggest themselves to those skilled in the art and which are encompassed in the spirit of the disclosure and as defined in the claims.

We claim:

1. A scale system comprising:
   a scale comprising a plurality of feet and a plurality of load cells, wherein each of the plurality of load cells is associated with one of the plurality of feet; and
   a base comprising:
      a plate comprising an upper surface and a lower surface; and
      a plurality of supports extending from the lower surface, wherein each of the plurality of supports comprises a columnar projection,
   wherein the base and the scale are permanently attached to form a single unit or wherein the scale system further comprises a locking feature for selectively securing the scale to the base.

2. The scale system of claim 1, further comprising a plurality of locators on the upper surface, wherein each of the plurality of locators is adapted to contact one of the plurality of feet.

3. The scale system of claim 2, further comprising a plurality of ribs extending from the lower surface.

4. The scale system of claim 1, wherein the plate defines a plurality of openings therethrough.

5. The scale system of claim 3, wherein the scale comprises four feet and four load cells, and wherein the base comprises four locators and four supports.

6. The scale system of claim 3, wherein each of the plurality of supports comprises:
   an annular projection extending from the lower surface; and
   a plurality of columnar projections extending from the annular projection.

7. The scale system of claim 6, further comprising an angled ramp connecting the annular projection to at least one of the plurality of ribs.

8. The scale system of claim 7, wherein the angled ramp comprises a plurality of ramps.

9. The scale system of claim 1, wherein a distance from the bottom surface to an end of the columnar projection is selected from at least about 20 mm, at least about 25 mm, and about 27.5mm.

10. The scale system of claim 1, wherein the columnar projection is adapted to penetrate carpet pile.

11. The scale system of claim 1, wherein the scale comprises a scale perimeter dimension and the base comprises a base perimeter dimension greater than the scale perimeter dimension.

12. The scale system of claim 2, wherein at least one of the plurality of locators comprises a receiver for receiving at least one of the plurality of feet.

13. The scale system of claim 2, wherein the locator comprises a resilient element.

14. The scale system of claim 1, wherein the base and the scale are permanently attached to form a single unit.

15. The scale system of claim 1, wherein the scale system comprises a locking feature for selectively securing the scale to the base.

16. A scale system comprising:
   a scale comprising a plurality of feet and a plurality of load cells, wherein each of the plurality of load cells is associated with one of the plurality of feet; and
   a base comprising:
      a plate comprising an upper surface and a lower surface;
      a plurality of locators on the upper surface, wherein each of the plurality of locators is adapted to contact one of the plurality of feet, and wherein at least one of the plurality of locators comprises a receiver for receiving at least one of the plurality of feet; and
      a plurality of supports extending from the lower surface, wherein each of the plurality of supports comprises a columnar projection.

17. The scale system of claim 16, further comprising a plurality of ribs extending from the lower surface.

18. The scale system of claim 17, wherein each of the plurality of supports comprises:
   an annular projection extending from the lower surface; and
   a plurality of columnar projections extending from the annular projection.

19. The scale system of claim 18, further comprising an angled ramp connecting the annular projection to at least one of the plurality of ribs.

20. The scale system of claim 16, wherein the columnar projection is adapted to penetrate carpet pile.

* * * * *